(12) United States Patent
Li et al.

(10) Patent No.: US 8,786,268 B2
(45) Date of Patent: Jul. 22, 2014

(54) CURRENT MODE VOLTAGE REGULATOR WITH AUTO-COMPENSATION

(75) Inventors: Jian Li, San Jose, CA (US); Jindong Henry Zhang, Fremont, CA (US)

(73) Assignee: Linear Technology Corporation, Milpitas, CA (US)

( * ) Notice: Subject to any disclaimer, the term of this patent is extended or adjusted under 35 U.S.C. 154(b) by 278 days.

(21) Appl. No.: 13/536,596

(22) Filed: Jun. 28, 2012

(65) Prior Publication Data

US 2014/0002043 A1 Jan. 2, 2014

(51) Int. Cl.
*H02M 3/157* (2006.01)

(52) U.S. Cl.
USPC .......................................... 323/285; 323/283

(58) Field of Classification Search
CPC ............... H02M 3/156; H02M 3/157; H02M 2001/0025; H02M 2001/0019
USPC ................................................ 323/285, 283
See application file for complete search history.

(56) References Cited

U.S. PATENT DOCUMENTS

| | | | |
|---|---|---|---|
| 6,064,187 A | 5/2000 | Redl et al. | |
| 8,115,459 B2 | 2/2012 | Prodic et al. | |
| 2008/0252280 A1 | 10/2008 | Prodic et al. | |
| 2009/0309567 A1* | 12/2009 | Morroni et al. | 323/283 |
| 2011/0071700 A1 | 3/2011 | Beck et al. | |

OTHER PUBLICATIONS

Mariko Shirazi et al., "An Autotuning Digital Controller for DC-DC Power Converters Based on Online Frequency-Response Measurement," IEEE Transactions on Power Electronics, Nov. 2009, pp. 2578-2588, vol. 24, No. 11.
Andrea Pizzutelli et al., "Relay Based Digital Auto-Tuning Techniques for Isolated DC-DC Switching Converters," Telecommunications Energy Conference, 2007, pp. 533-540.
Zhenyu Zhao et al., "Limit-Cycle Oscillations Based Auto-Tuning System for Digitally Controlled DC-DC Power Supplies," IEEE Transactions on Power Electronics, Nov. 2007, pp. 2211-2222, vol. 22, No. 6.
M. Shirazi et al., "Autotuning Techniques for Digitally-Controlled Point-of-Load Converters with Wide Range of Capacitive Loads," Applied Power Electronics Conference, 2007, pp. 14-20.

* cited by examiner

*Primary Examiner* — Harry Behm
*Assistant Examiner* — Matthew Grubb
(74) *Attorney, Agent, or Firm* — Patent Law Group LLP; Brian D Ogonowsky

(57) ABSTRACT

A method for automatically compensating a voltage regulator initially disconnects the error amplifier and compensation network from the feedback loop. A DC bias voltage is applied to the feedback loop to cause the regulator's output voltage to be at 90% of its nominal value. An AC perturbation signal is then added to the DC bias voltage to cause the output voltage to have a ripple at a frequency of the AC signal. The gain of the feedback loop and the phase difference between the AC signal and the ripple is then measured. The measured values are then used to automatically adjust operating characteristics of the error amplifier and the compensation network such that, when these components are connected back in the feedback loop during normal operation, the feedback loop has the desired gain and phase margin at the frequency of the AC signal, such as the loop's unity gain frequency.

34 Claims, 8 Drawing Sheets

CURRENT MODE VOLTAGE REGULATOR WITH AUTO-COMPENSATION

FIELD OF THE INVENTION

This invention relates to voltage regulators and, in particular, to a current mode voltage regulator having automatic compensation for improving the stability of a feedback loop.

BACKGROUND

A current mode voltage regulator regulates an output voltage by regulating the current through an inductor. The regulator uses both a relatively fast current feedback loop (which senses current) and a slower voltage feedback loop (which senses voltage) to control the output voltage. Due to phase shifting and delays in the feedback loops, stability is a concern. Oscillations may be avoided by selecting compensation components connected to the voltage feedback loop, such as a capacitor-resistor network, which attenuate the loop gain above a certain frequency and provide a desired phase shift. The optimum component values are determined based on the final design of the regulator, and the user is typically required to calculate or manually test and decide on the optimum component values. One method of compensating the regulator is to add a capacitor-resistor network external to the regulator chip at the output of an error amplifier. However, this requires the user to optimize the regulator manually to have a desired phase margin at a desired unity gain frequency (cross-over frequency) of the feedback loop, and the complexity of optimizing performance of the regulator is typically outside the skill level of the users who are not experienced power supply designers.

It is not desirable to simply compensate the regulator using predetermined component values to guarantee stability under worst case conditions (e.g., parameter variations over time), since the transient performance cannot be optimized.

Therefore, what is needed is a fast auto-compensation technique that automatically tests (identifies) the initial characteristics of a current mode voltage regulator, then automatically adjusts the characteristics of the regulator to optimally compensate it so as to customize the regulator for the user's specific needs. The technique must avoid instability and output voltage overshoot during the auto-compensation process. The auto-compensated system should have high bandwidth to provide fast transient responses and sufficient stability margin.

SUMMARY

A circuit technique and method is described for automatically compensating a current mode voltage regulator.

In one embodiment of the invention, the regulator includes an error amplifier Hv (which may be a transconductance amplifier) that normally receives a divided output voltage (a feedback voltage Vfb) and compares that voltage to a reference voltage Vref. The divided output voltage may be created using a resistor divider. During normal operation of the regulator, an output of the error amplifier Hv is compensated by a capacitor-resistor network to generate a threshold voltage (Vith). When the regulator's power switch is turned on at the beginning of a switching cycle, a current sense voltage corresponding to the ramping current through the output inductor is compared to the threshold voltage by a pulse width modulation (PWM) comparator. The crossing of the threshold voltage by the rising current sense voltage turns off the power switch until the next switching cycle begins. The switching is typically at a rate of 200 KHz or higher. This feedback results in the divided output voltage approximately equaling the reference voltage.

In one embodiment of the inventive technique, during the start-up of the regulator (e.g., when power is applied), the error amplifier Hv and its compensation network are effectively disconnected from the feedback loop. The divided output voltage Vfb is applied to one input of a subtractor (a differential amplifier), and a DC bias voltage is applied to the other input of the subtractor. The DC voltage Vdc substitutes for the reference voltage to which the divided output voltage is compared. The output of the subtractor is applied to an input of the PWM comparator as a threshold voltage Vith for setting the duty cycle of the power switch. Thus, the divided output voltage is controlled to be very close to the DC voltage. The maximum DC voltage is set so that the regulator's maximum output voltage is slightly less than the nominal output voltage (e.g., 90%). In one embodiment, the DC voltage is ramped up to its maximum target voltage to provide a soft-start of the regulator and limit the peak current through the power switch.

In one embodiment, the divided output voltage Vfb is connected via an amplifier to the subtractor input. The amplifier supplies a proportional feedback signal with gain of kp to the subtractor, if needed, to prevent instability during the automatic compensation phase. The amplifier thus controls the loop gain during the auto-compensation process. The amplifier is optional. In one embodiment, the gain of the amplifier is controllable from unity gain to any positive gain.

Next, an AC perturbation signal Vac, which can be a few sine wave pulses or a simplified waveform that is close to a sine wave, is injected on top of the DC voltage Vdc, where the frequency of Vac is set to a desired unity gain frequency of the feedback loop. The unity gain frequency is also referred to as a cross-over frequency, and may be determined by the user. The user also identifies a desired phase margin of the loop at the cross-over frequency, such as greater than 45 degrees. The desired cross-over frequency of the feedback loop will typically be close to ⅙ to ¹⁄₁₀ of the switching frequency of the power switch for a buck converter. The Vac should have a small enough amplitude so that the regulator's output voltage does not exceed the maximum output voltage. In one embodiment, the amplitude of the sine wave is 5-10% of the total compensation voltage (Vc) applied to the subtractor.

In response, the divided output voltage of the regulator will be a sine wave (with a DC bias) having a certain amplitude and phase. The amplitude and phase of the divided output voltage sine wave are then compared to the amplitude and phase of the injected sine wave to derive an amplitude ratio (loop gain) and phase difference at the cross-over frequency. This stage of the method is referred to as system identification.

The measured amplitude ratio and phase difference, as well as the desired cross-over frequency and phase margin, are then applied to a look-up table or algorithms. The look-up table or algorithms then identifies the required transconductance (gm) of the error amplifier Hv (if it is a transconductance amplifier) and the required compensation circuit characteristics (e.g., time constant) to cause the regulator, during normal operation, to have the desired cross-over frequency and the desired phase margin. The auto-compensation circuit then adjusts the gm of the error amplifier and the value of a resistor in the compensation circuit to have the calculated values. This will prevent oscillations during normal operation. This stage of the method is referred to as compensation adjustment.

Next, the feedback loop is closed by reconnecting (or enabling) the adjusted error amplifier and adjusted compensation network. The voltage source that generated the DC value during the system identification stage, or another voltage source, then generates the fixed reference voltage for the error amplifier for normal operation. This stage of the method is referred to as loop closure.

Lastly, the regulator is operated normally, where the adjusted error amplifier and adjusted compensation network cause the output voltage to ramp up to 100% of the desired output voltage due to the feedback loop causing the divided output voltage to approximately equal the reference voltage.

The auto-compensation circuit may be implemented on the same chip as the regulator controller or on a separate chip. The chip includes at least the adjustable resistor in the compensation network and the adjustable error amplifier.

In one embodiment, the auto-compensation circuit includes a digital-to-analog converter, controlled by a digital controller, for generating the DC and sine wave signals during the system identification stage. The controller may be a state machine. The controller receives the amplitude and phase signals, from an analog-to-digital converter, during the system identification stage and controls a compensation adjustment circuit to adjust the gm of the error amplifier and the value of the resistor in the compensation circuit. The compensation circuit and error amplifier are analog circuitry.

In another embodiment, the compensation circuit and error amplifier may be an equivalent-function digital circuit having an adjustable transfer function. The amplitude and phase information during the system identification stage is used to adjust the transfer function of the digital circuit. The divided output voltage is converted to a digital signal for processing by the digital circuit. After the auto-compensation technique is completed, during normal operation, the digital circuit generates a compensated digital signal equivalent to a compensated error amplifier output signal. The digital signal is then converted to an analog signal and applied to the subtractor. The subtractor then subtracts the divided output voltage from the analog signal to create the threshold voltage (Vith) for application to the PWM comparator.

Other embodiments are described.

BRIEF DESCRIPTION OF THE DRAWINGS

Elements that are the same or equivalent are labeled with the same numeral.

DETAILED DESCRIPTION

The various figures illustrate stages of the auto-compensation process by highlighting only the hardware used during that stage, even though the actual regulator hardware does not change during the process. The figures will be described in combination with the flowchart of FIG. 15.

An example of a conventional current mode buck regulator is used in the figures; however, the auto-compensation technique can be applied to all types of current mode regulators.

Figure 1:
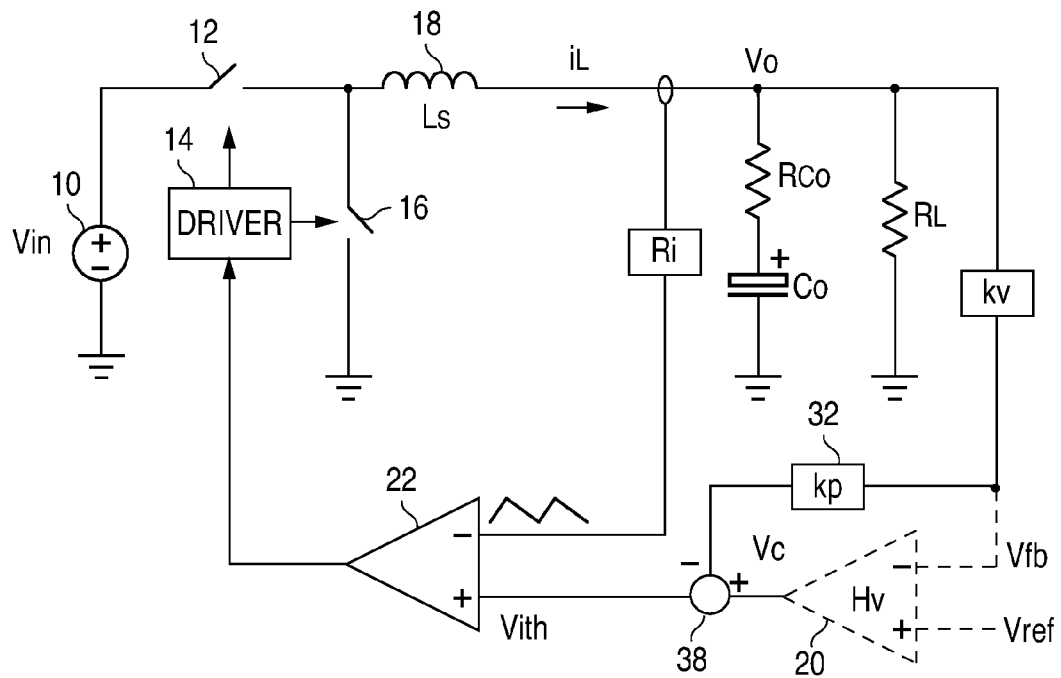
FIG. 1 illustrates a current mode voltage regulator at start up with the error amplifier Hv and its compensation network disconnected from the feedback loop.

FIG. 1 illustrates conventional aspects of a certain current mode regulator modified in accordance with one embodiment of the invention. Since current mode regulators are very well-known, only a brief explanation of its normal operation is provided herein for completeness.

An unregulated input voltage source 10 is applied to a power switch 12, which may be a transistor. A driver 14 controls the duty cycle of the power switch 12 and a synchronous rectifier switch 16, which may be a transistor. In another embodiment, a diode is used instead of a synchronous rectifier. When the power switch 12 is closed, an inductor 18 conducts a ramping current, and this current is sensed by various means. The current may be sensed by a low value resistor in series with the inductor 18, where the voltage drop across the resistor is applied to a differential amplifier to create a sense voltage proportional to the current. In FIG. 1, the block Ri represents the equivalent current sensor transfer function of the inductor current. The inductor current may also be sensed by a reference transistor in parallel with the power switch 12, or by other ways.

The ramping current is smoothed by an output capacitor Co in series with its parasitic resistor $R_{Co}$. The output voltage Vo is applied to a load $R_L$.

To achieve regulation, the output voltage is divided by a resistor divider (represented by the proportional circuit Kv). Normally, this divided output voltage (Vfb) is compared to a fixed reference voltage by an error amplifier 20 (which may be a transconductance amplifier), and the feedback loop controls the duty cycle of the power switch 12 to maintain the divided output voltage approximately equal to the reference voltage.

The output of the error amplifier 20 is connected to a resistor-capacitor compensation network (not shown in FIG. 1) to generate a threshold voltage (Vith). The compensation network has characteristics that prevent oscillations in the feedback loop. Vith is connected to one input of a PWM comparator 22 and its other input is connected to receive the current sense signal. Other signals may be connected to the PWM comparator 22 in other embodiments, as would be understood by those skilled in the art.

When the current sense signal crosses Vith, the driver 14 turns off the power switch 12 and turns on the synchronous rectifier 16. Thus, the peak current through the power switch 12 or inductor 18 is regulated. The inductor 18 is then discharged through the synchronous rectifier 16 to ramp down the current. The output capacitor Co filters out the ripple.

A clock then starts the switching cycle again by causing the driver 14 to turn on the power switch 12. Other techniques are also used to start the cycle, such as by detecting when the current through the inductor 18 begins to reverse or other methods.

FIG. 1 illustrates the functional aspects of the regulator upon power being initially applied to the regulator upon start up. Step 26 in FIG. 15 identifies a power off condition, and step 28 identifies that the regulator is being started up. The auto-compensation technique need only be implemented once in the lifetime of the regulator the first time it is started up. In another embodiment, a reset function is included to perform the auto-compensation technique any time the user wishes to change the compensation characteristics. In another embodiment, the auto-compensation technique is performed every time the regulator is powered up.

Figure 15:
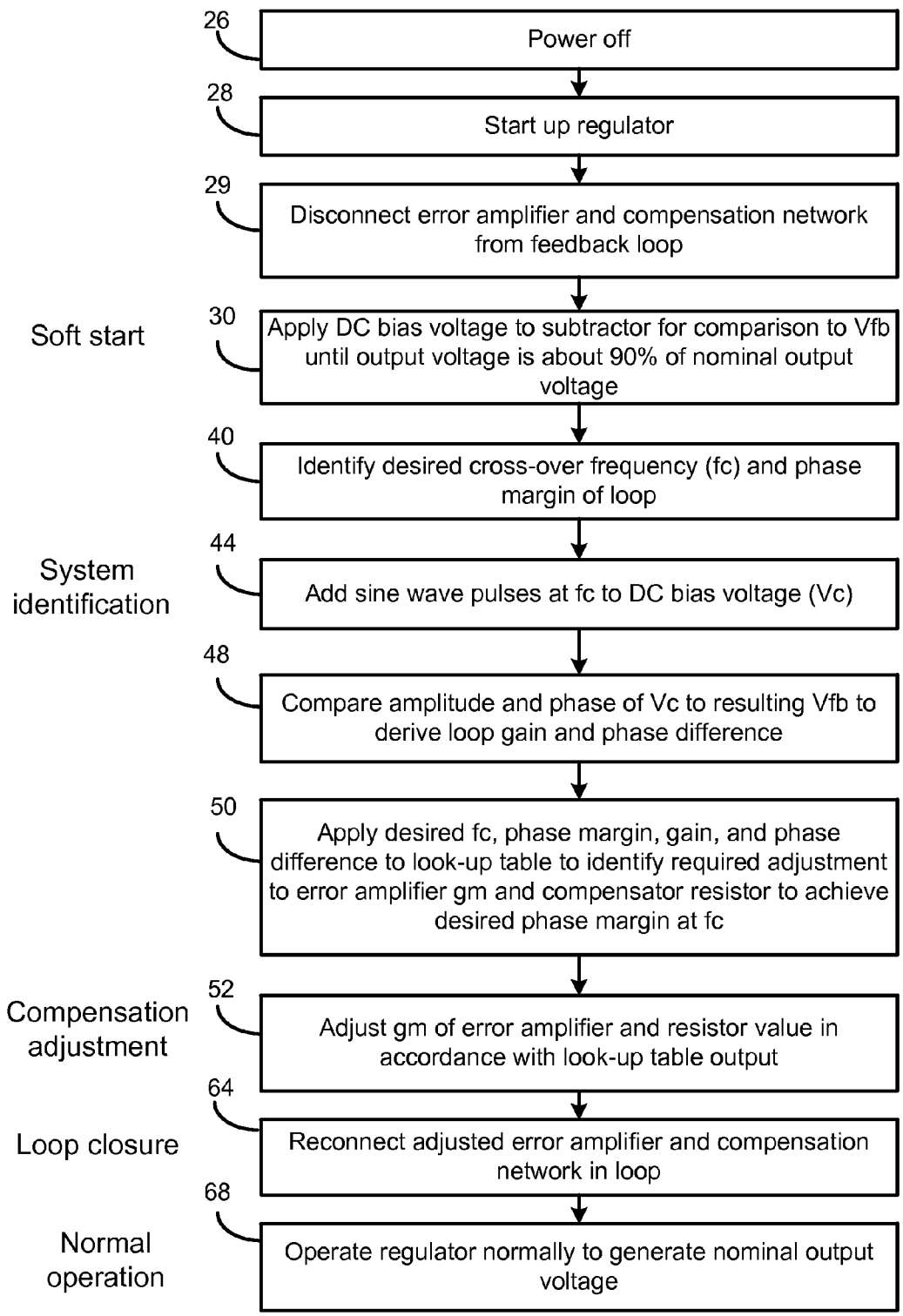
FIG. 15 is a flowchart identifying various steps performed during one embodiment of the invention.

In step 29 of FIG. 15, and as shown in FIG. 1, the error amplifier 20 and compensation network are disconnected from the feedback loop or disabled. Disconnection may be via a switch, and disabling may be by turning off power to the error amplifier 20.

An optional amplifier 32 generates a signal proportional to the divided output voltage (Vfb). Its gain may be unity or any positive gain, and the amplifier 32 is used to prevent instability of the regulator during the auto-compensation process, to be described later.

Figure 2:
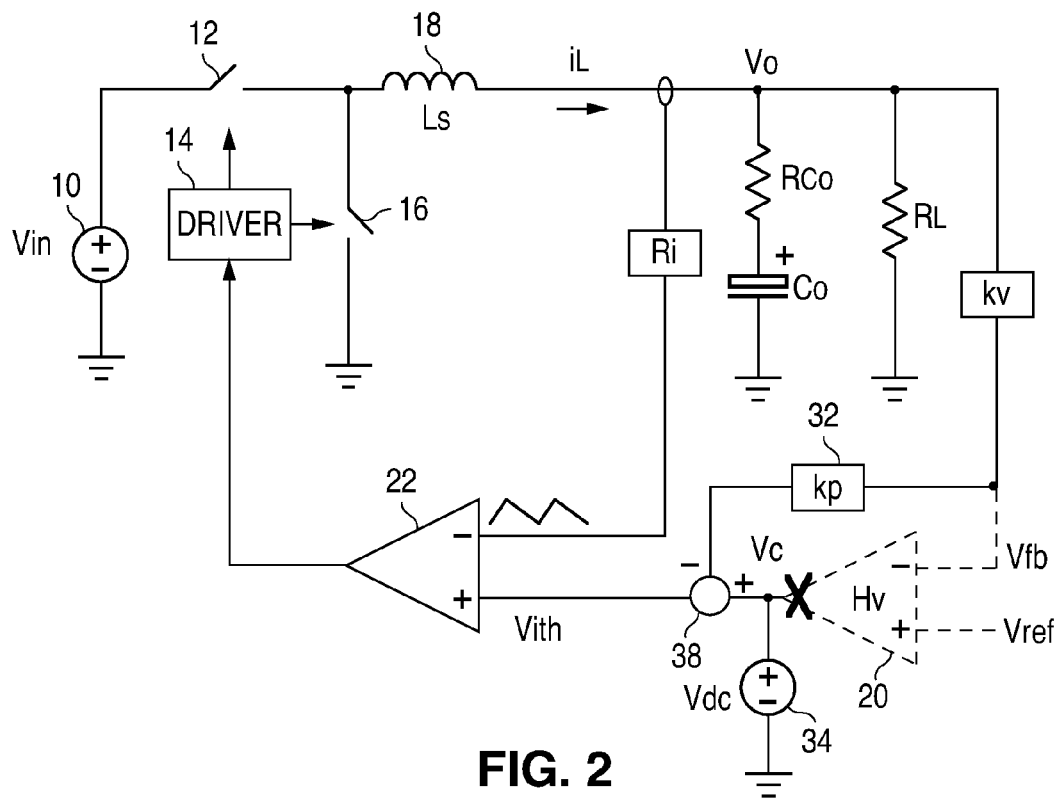
FIG. 2 illustrates the regulator with a DC voltage being applied to a subtractor to ramp up the output of the regulator to about 90% of its nominal output voltage during a soft start stage.

Next, in step 30, as shown in FIG. 2, a voltage source 34, generating Vdc, is applied to a first input of a subtractor 38 (a differential amplifier). The divided output voltage (assuming the gain of the amplifier 32 is one) is applied to a second input of the subtractor 38. The duty cycle of the regulator is determined by the difference between the two signals applied to the subtractor 38 since the output of the subtractor 38 provides the threshold voltage (Vith). The voltage applied to the first input of the subtractor 38 will be referred to as Vc.

The Vdc is ramped to a final voltage to provide a soft start of the regulator, which limits the peak current of the power switch 12. This causes the output voltage to ramp up. The final Vdc is set so that the maximum output voltage is about 90% of the nominal output voltage. This is because, when a sine wave is later added to Vdc, the maximum output voltage will not exceed the maximum output voltage intended by the user during normal operation to ensure no damage to any components. Any DC value that causes the output voltage to be between about 80-95% of its nominal value can be used, which dictates the maximum amplitude of the allowable sine wave.

Figure 3:
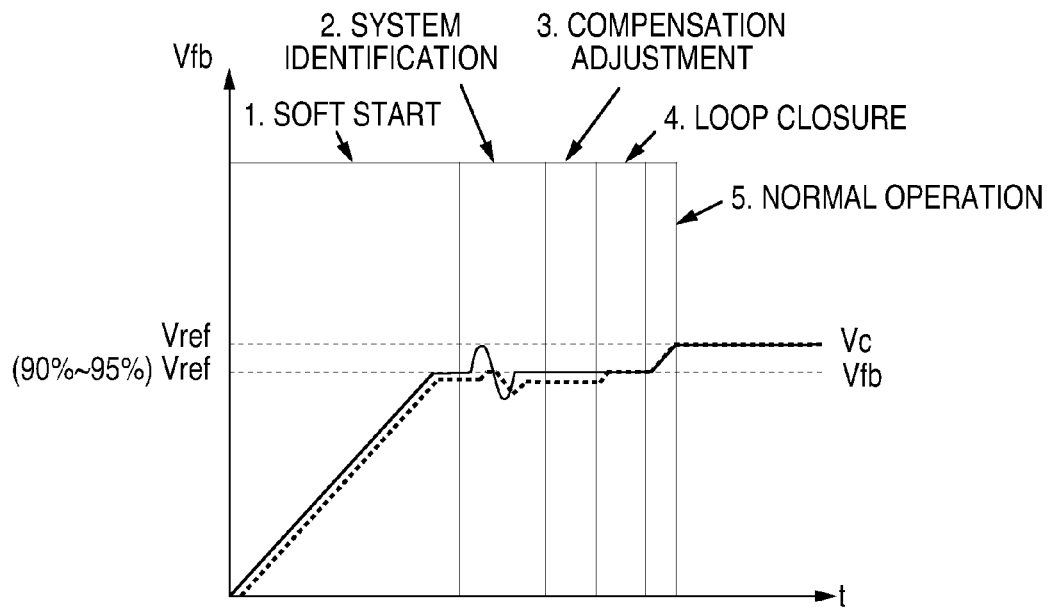
FIG. 3 illustrates the combined DC bias and compensation perturbation voltage (Vc), applied to the subtractor, and the divided output voltage (Vfb) of the regulator, where the divided output voltage is in response to Vc, at various stages of the auto-compensation process.

This stage of the process is referred to as the soft start stage, and is shown in FIGS. 3 and 15.

FIG. 3 shows the Vc signal as a solid line, and the resulting Vfb signal is shown as a dashed line. Note how Vfb generally follows Vc but is delayed and is proportional, depending on the loop gain, during the auto-compensation process. The two lines overlap during the steady-state normal operation of the regulator.

In step 40 of FIG. 15, the manufacturer or user of the regulator designates a desired unity gain frequency of the feedback loop, also referred to as a cross-over frequency fc. Frequencies below the cross-over frequency will not cause oscillations. Selecting a cross-over frequency involves a tradeoff between responsiveness of the regulator to changes in load conditions and the ability to avoid oscillations. Typically, the cross-over frequency is set to between ⅙ and 1/10 the switching frequency of the power switch 12 for a buck converter. It may vary depending on different topologies. Typical switching frequencies are between 100 KHz and 10 MHz.

The manufacturer or user also selects a desired phase margin at the cross-over frequency, which will typically be greater than 45 degrees. Phase margin, in this context, is the difference between the phase, measured in degrees, of the loop's output signal (relative to its input) and 180 degrees. Typically the phase lag (relative to input) varies with frequency, progressively increasing to exceed 180 degrees, at which frequency the output signal becomes inverted, or antiphase in relation to the input. The phase margin thus decreases as the frequency approaches the frequency at which inversion sets in. In the presence of negative feedback, a zero or negative phase margin at a frequency where the loop gain exceeds unity guarantees instability. Thus a positive phase margin is a "safety margin" that ensures proper (non-oscillatory) operation of the circuit.

Figure 4:
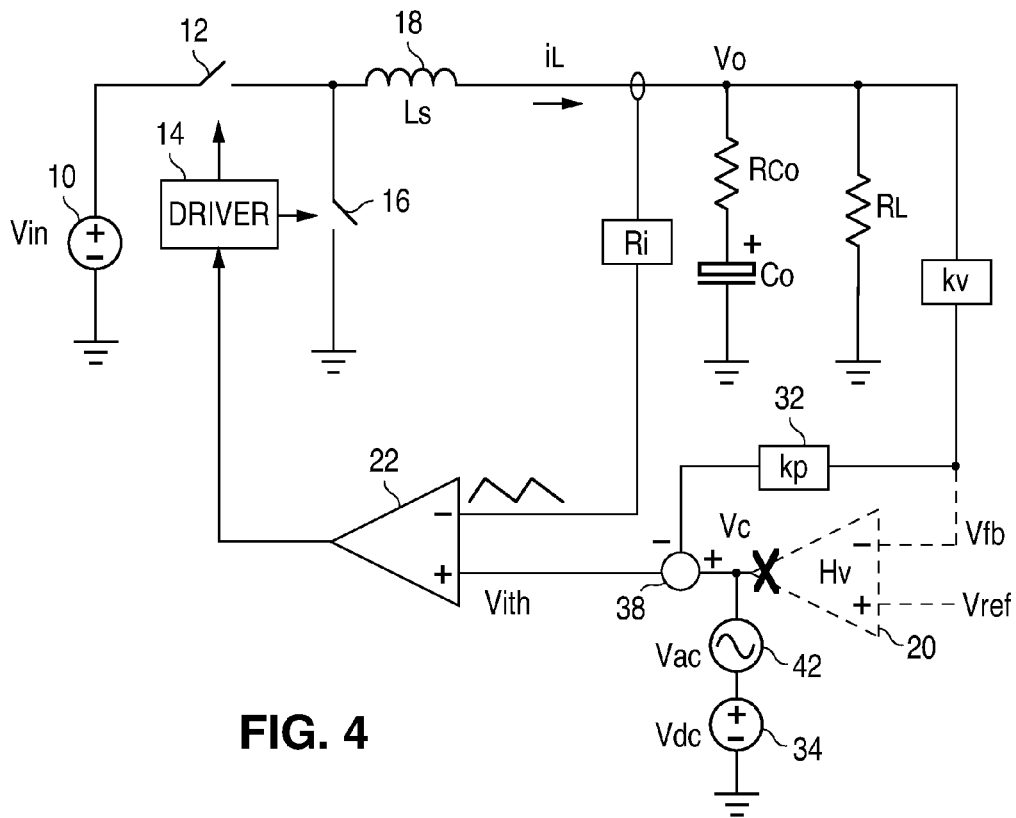
FIG. 4 illustrates the regulator having a sine wave perturbation voltage Vac added to the DC voltage during the system identification stage.
Figure 5:
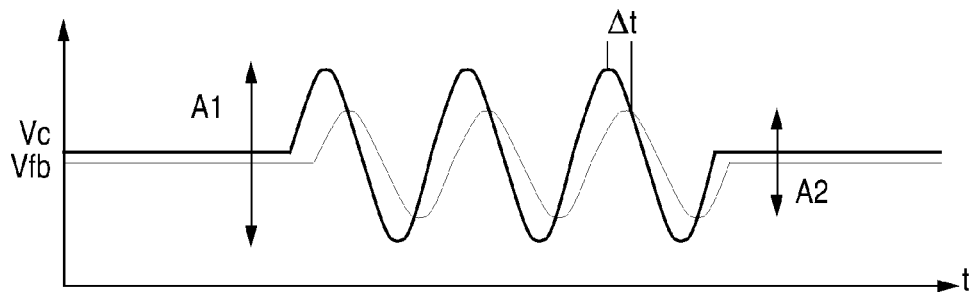
FIG. 5 illustrates the Vc and Vfb signals during the system identification stage of the auto-compensation process.

FIG. 4 illustrates the system identification stage of the process, which occurs without any compensation. A sine wave generator 42, in series with the DC voltage source 34, is controlled to generate a sine wave at the selected cross-over frequency (fc) and at an amplitude that does not cause the output voltage to exceed its maximum value. The DC bias voltage plus the sine wave is shown as the voltage Vc in FIG. 5. Limiting the amplitude ensures that no over-voltage damage will be caused to components connected to the output terminal of the regulator. The sine wave is applied as a few pulses (step 44), such as 3-4 cycles. As shown in FIG. 5, this will cause the divided output voltage (Vfb) to generally follow the Vc signal but have a reduced amplitude and have a phase delay. The ripple is somewhat smoothed by the output capacitor Co.

In FIG. 5, the phase delay is shown by delta T, and the gain of the loop is identified by A2/A1. The phase difference is delta T*fc*360 degrees. In another embodiment, the sine wave need not be a precise analog sine wave but may be a stepped signal having discrete levels, such as a signal from a digital to analog converter, resembling a sine wave. Such AC signals are also referred to herein as sine waves. Other suitable perturbation signals can be used, although a sinusoidal signal is the simplest.

In another embodiment, the system identification test can be performed at any frequency desired by the user, not just the cross-over frequency, and the regulator will ultimately have the designated phase margin at that frequency. Multiple frequency points may also be designated, and the system can be programmed to optimize performance at the various frequency points.

In step 48, the resulting Vc and Vfb signals are detected to derive the loop gain and phase difference.

If the error amplifier 20 and compensation network were connected in the loop, and the perturbation signal was injected into the loop, overshoots, undershoots, or ringing may occur, distorting the system identification information. Therefore, the process improves upon conventional auto-compensation circuits by removing the effects of the error amplifier and compensation network from the loop during the system identification stage of the process. Further, the addition of the proportional feedback loop through the amplifier 32 ensures stability during the system identification stage. Setting the gain of the amplifier 32 to greater than unity also reduces the DC error during the auto-compensation process. If an acceptable amplifier 32 gain (Kp) is unity, the amplifier 32 may be omitted, and the Vfb signal is directly connected to the subtractor 38. The Vfb/Vc gain is always lower than 1/Kp, so there is no potential risk of unstable oscillation during system identification.

A low pass filter may be connected in series with the amplifier 32 to attenuate switching ripple and high frequency noise in the loop.

In step 50, the desired cross-over frequency, the desired phase margin, the measured loop gain, and the measured phase difference are applied to algorithms or a look-up table to identify the gm of the error amplifier 20 and compensator characteristics needed to achieve the desired cross-over frequency and phase margin. Such pre-stored values in a look-up table memory may be generated by simulation or empirical data. In the example described herein, the compensation circuit is a capacitor-resistor network, and the compensator characteristics may be suitable adjusted by adjusting the value of the resistor. In other embodiments, the value of the capacitor may be adjusted by connecting capacitors in series and/or parallel by controllable switches or fuses.

Figure 6:
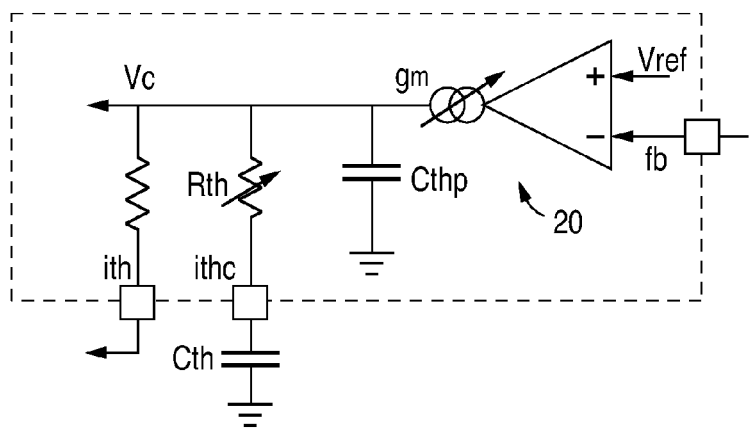
FIG. 6 illustrates the error amplifier and compensation network in one embodiment of the invention, where the gm of the error amplifier is adjustable and a resistor Rth value in the compensation network is adjustable. The additional capacitor Cthp may be used to filter high frequency noise.

FIG. 6 illustrates detail of the error amplifier 20 and compensator network, where the gm of the error amplifier 20 is adjustable and the resistance of the resistor Rth is adjustable. The resistor Rth and the small capacitor Cthp may be on the same chip as the regulator and the auto-compensation circuit, and the larger capacitor Cth may be external. The specifications for the regulator may dictate the required value of the capacitor Cth in order for the compensation calculations to be accurate.

Step 52 is part of the compensation adjustment stage of the process, where the gm of the error amplifier 20 and the resistor Rth value in the compensation network are adjusted to achieve the desired cross-over frequency and phase margin. The gm of the error amplifier 20 should be adjusted so its gm is the inverse of the detected loop gain in the system identification test, so that the actual loop gain, when the error amplifier 20 is reconnected into the loop, will be unity at the designated cross-over frequency. Similarly, the compensation network is adjusted (e.g., its time constant adjusted) to offset any phase difference that would have caused the actual phase margin to be other than the desired phase margin at the cross-over frequency after the compensation network is reconnected into the loop. The required phase offset equals −(180 degrees−PD−PM), where PD is the measured phase difference and PM is the targeted phase margin.

Figure 7:
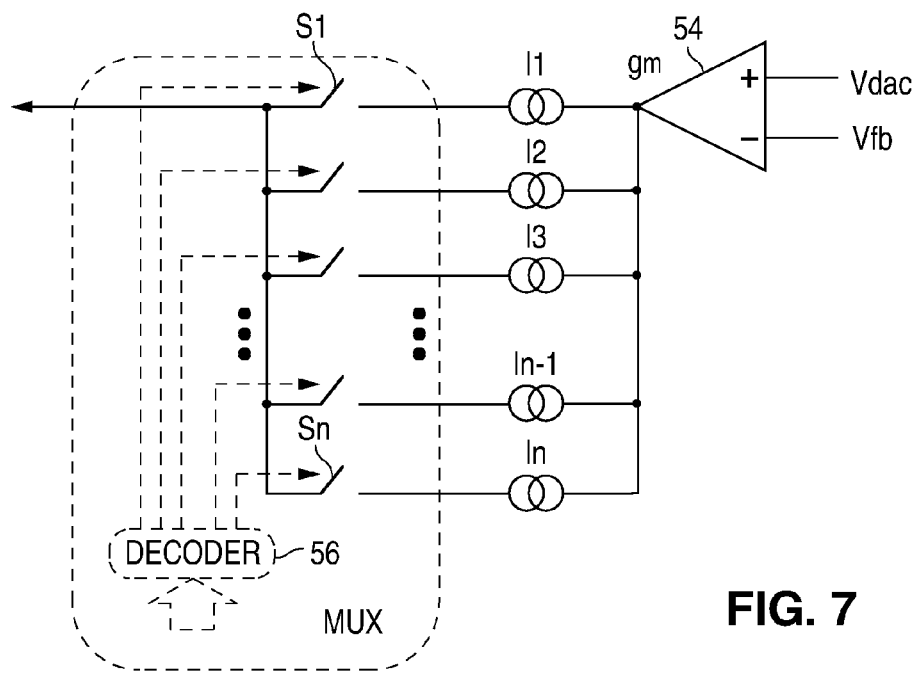
FIG. 7 illustrates one of many ways in which the gm of the error amplifier may be adjusted during the compensation adjustment stage of the process.

FIG. 7 illustrates a circuit for adjusting the gm of the error amplifier 20 by selectively connecting controllable current sources I1-In in parallel. Each current source is controlled by the output voltage of a differential amplifier 54. The look-up table, which is part of a digital controller, provides a digital code to a decoder 56 corresponding to the required gm needed to achieve the desired cross-over frequency and phase margin. The decoder 56 then controls the switches S1-Sn to connect the designated number of controllable current sources I1-In in parallel. The current sources I1-In may be all the same or weighted, such as binary weighted for achieving a wide range of gm with high precision. The decoder 56 and switch configuration may be considered a multiplexer.

Figure 8A:
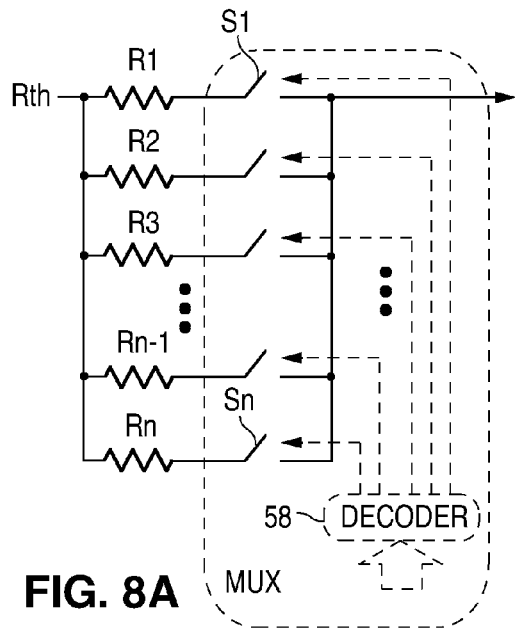
FIG. 8A illustrates one of many ways in which the value of the resistor in the compensation network may be adjusted during the compensation adjustment stage of the process.

FIG. 8A illustrates a circuit for adjusting the resistance of resistor Rth in FIG. 6 to achieve the required compensation circuit characteristics (e.g., the desired time constant) for achieving the desired cross-over frequency and phase margin. The look-up table provides a digital code to a decoder 58 corresponding to the required resistance. The decoder 58 then controls the switches S1-Sn to connect the designated number of resistors R1-Rn in parallel. The resistors R1-Rn may be all the same or weighted, such as binary weighted for achieving a wide range of Rth with high precision. The decoder 58 and switch configuration may be considered a multiplexer.

Figure 8B:
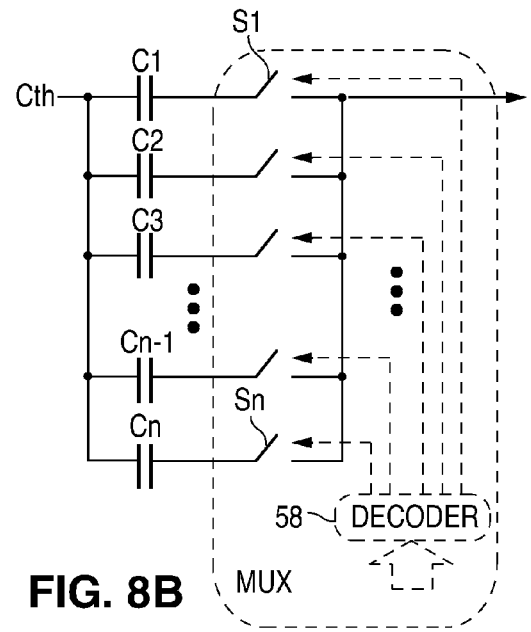
FIG. 8B illustrates one of many ways in which the value of a capacitor in the compensation network may be adjusted during the compensation adjustment stage of the process.

As shown in FIG. 8B, in addition to adjusting the resistance value, or instead of adjusting the resistance value, the capacitance value of Cth or Cthp (FIG. 6) may be adjusted using a similar technique to obtain the required time constant. In FIG. 8B, the capacitors C1 to Cn are selectively connected in parallel by switches S1-Sn to achieve a desired time constant. The capacitors may be binary weighted. All capacitors may be located on the same chip as the regulator and the auto-compensation circuit.

Figure 9:
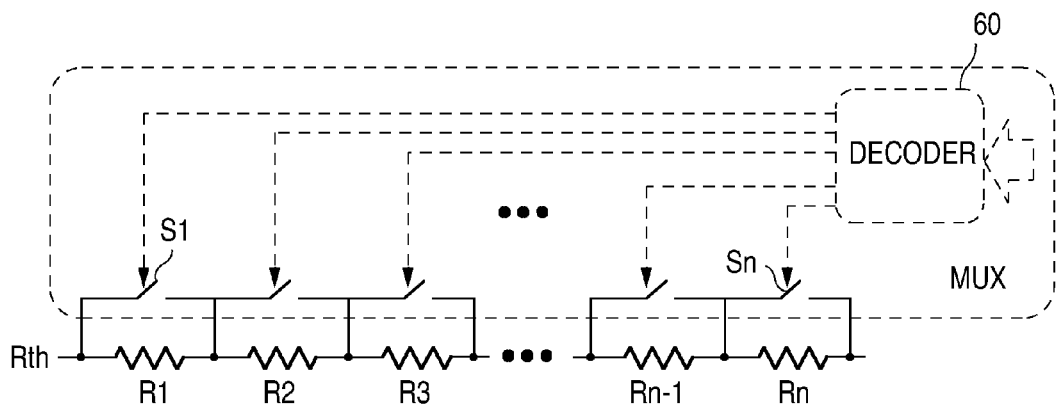
FIG. 9 illustrates another of many ways in which the value of the resistor in the compensation network may be adjusted during the compensation adjustment stage of the process.

FIG. 9 illustrates another circuit for adjusting the resistance of resistor Rth in FIG. 6 to achieve the required compensation circuit characteristics for achieving the desired cross-over frequency and phase margin. In FIG. 9, any combination of the resistors R1-Rn are connected in series, under control of the look-up table and decoder 60, to create the required value of Rth.

In another circuit for adjusting the resistor Rth, a fixed resistor can be switched in and out of the compensation network at a frequency 10-40 times higher than the power switch 12 frequency, where the duty cycle of the resistor switch is controlled to create an equivalent resistance.

Figure 10:
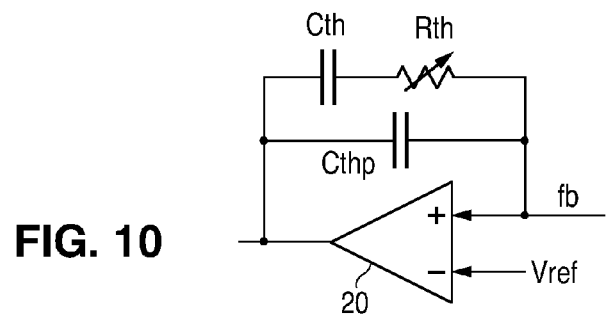
FIG. 10 illustrates an alternative compensation circuit that is connected to the adjustable error amplifier.

FIG. 10 illustrates a different configuration of the compensation network, comprising resistor Rth and capacitors Cth and Cthp. The value of the resistor Rth may be adjusted as shown in FIGS. 8 and 9.

Figure 11:
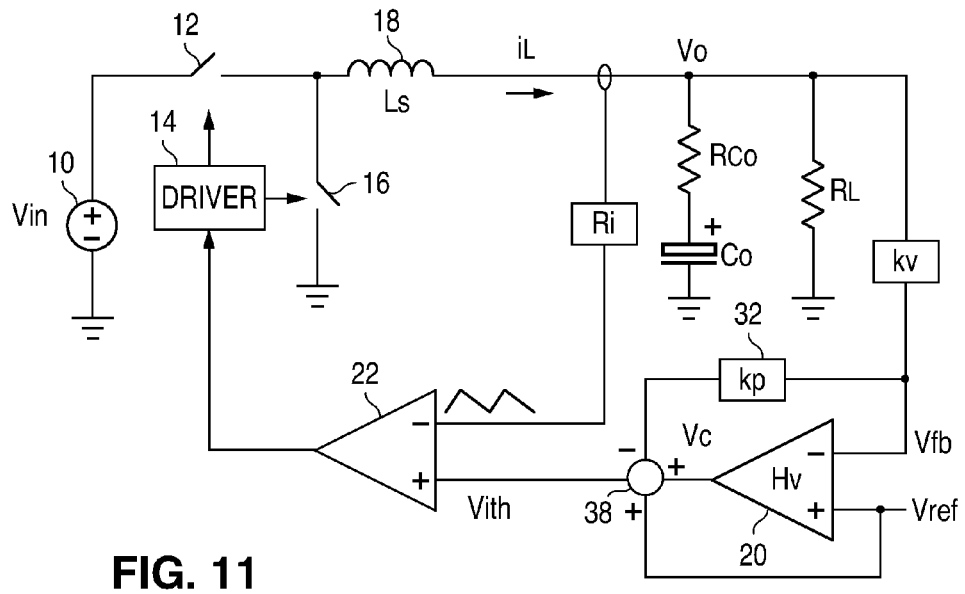
FIG. 11 illustrates the auto-compensation circuitry disconnected (or disabled) from the regulator, after the compensation adjustment stage, and the feedback loop being closed by reconnecting the error amplifier and compensation network into the loop.

Step 64 is part of the loop closure stage of the process, shown in FIG. 11. In FIG. 11, the adjusted error amplifier 20 and compensation network (see FIG. 6 or 10) are connected back into the feedback loop, and the voltage sources 34 and 42 (FIG. 4) are disconnected or disabled. In one embodiment, the DC voltage source 34 (FIG. 2) provides the reference voltage Vref. The compensated output of the error amplifier 20 now controls the duty cycle of the power switch 12 to make the divided output voltage Vfb approximately equal to Vref. A simple switch may connect the error amplifier 20 back into the loop, or the error amplifier 20 may be enabled in another way. The Vref is also connected to the subtractor 38 as a fixed bias voltage to offset the proportional divided output voltage Vfb applied to another input of the subtractor 38. Since the subtractor 38 remains in the feedback loop and since Vref is connected to the subtractor 38 (as well as to an input of the error amplifier 20) any undesirable undershoot during the loop closure process is eliminated The amplifier 32 remains in the loop, since it was a part of the feedback loop during the system identification stage of the process.

Step 68 is part of the normal operation stage of the process, where the adjusted regulator now operates in its normal manner while achieving the desired cross-over frequency and phase margin. The output voltage ramps up from the initial 90% of the nominal output voltage to 100% of the nominal output voltage since Vref is greater than the DC voltage generated during the soft start stage.

In another embodiment, the gm of the error amplifier is not adjusted by the auto-compensation system and only the compensation network is adjusted.

Instead of the additional feedback loop (containing the amplifier 32) being connected to the negative input of the subtractor 38, the additional feedback loop may be equivalently connected to the current sense signal, since the current sense signal and output of the substractor 38 are compared by the PWM comparator 22.

Figure 12:
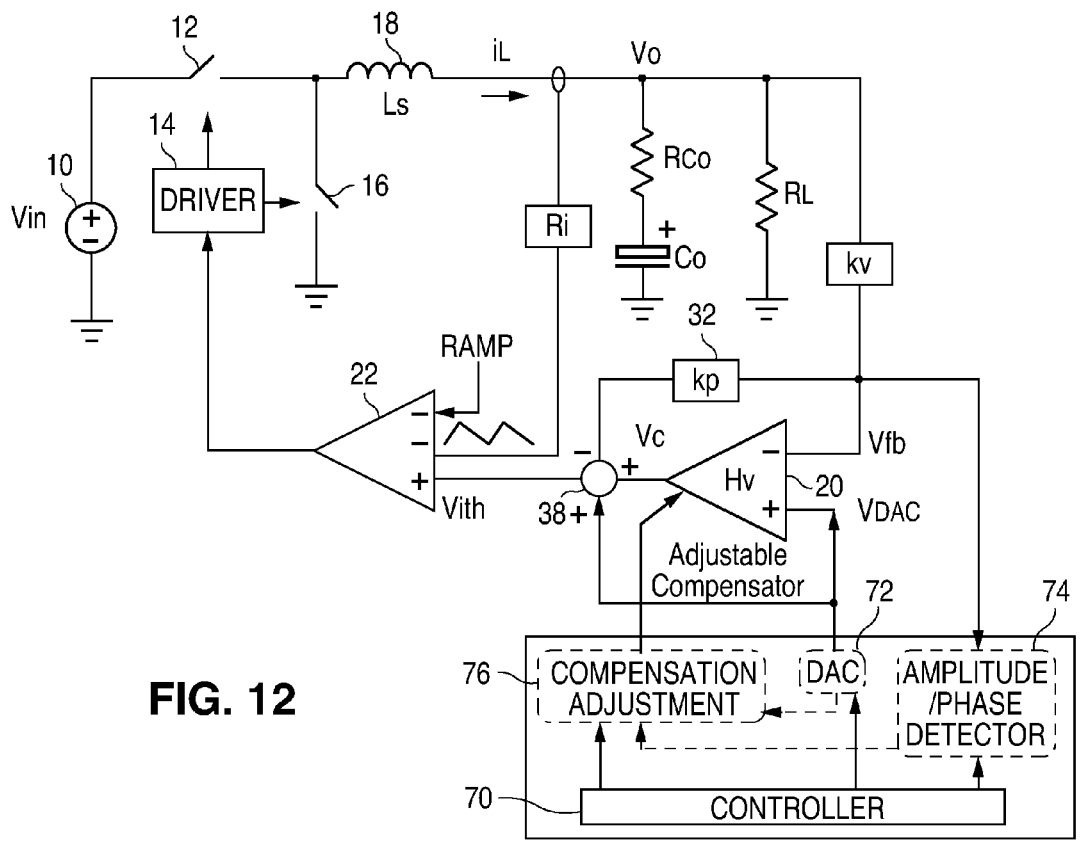
FIG. 12 illustrates an embodiment of the auto-compensation system connected to the error amplifier and compensation network to control their characteristics.

In the example, the feedback loop is analog for a fast and accurate response to changes in load current. FIG. 12 illustrates one implementation of an auto-compensation circuit for an analog error amplifier and compensation circuit. In FIG. 12, a digital controller 70, such as a state machine or other logic circuit, controls the process upon powering up of the regulator. The controller 70 controls the various stages shown in FIG. 3 and appropriately controls switches to remove the error amplifier 20 from the loop and reinsert it into the loop. Suitable external control terminals are provided to program the controller 70 with the desired information described herein. In the soft start stage, the controller 70 controls the digital-to-analog converter (DAC) 72 to apply the DC voltage shown in FIG. 3. During the system identification stage, the controller 70 controls the DAC 72 to add the sine wave to the Vc signal, shown in FIG. 4, and controls the amplitude/phase detector 74 to detect the loop gain and phase difference (FIG. 5) and apply these signals to a look-up table or algorithms to identify the required adjustments to the error amplifier 20 and compensation network. During the compensation adjustment stage, the digital outputs of the look-up table are applied to compensation adjustment circuitry 76 (FIGS. 7-9) to adjust the gm of the error amplifier and the resistor Rth in the compensation network. The look-up table maybe located within the compensation adjustment circuitry 76 block. During the loop closure stage, the controller 70 reconnects the error amplifier into the loop, and normal operation may begin.

Figure 13:
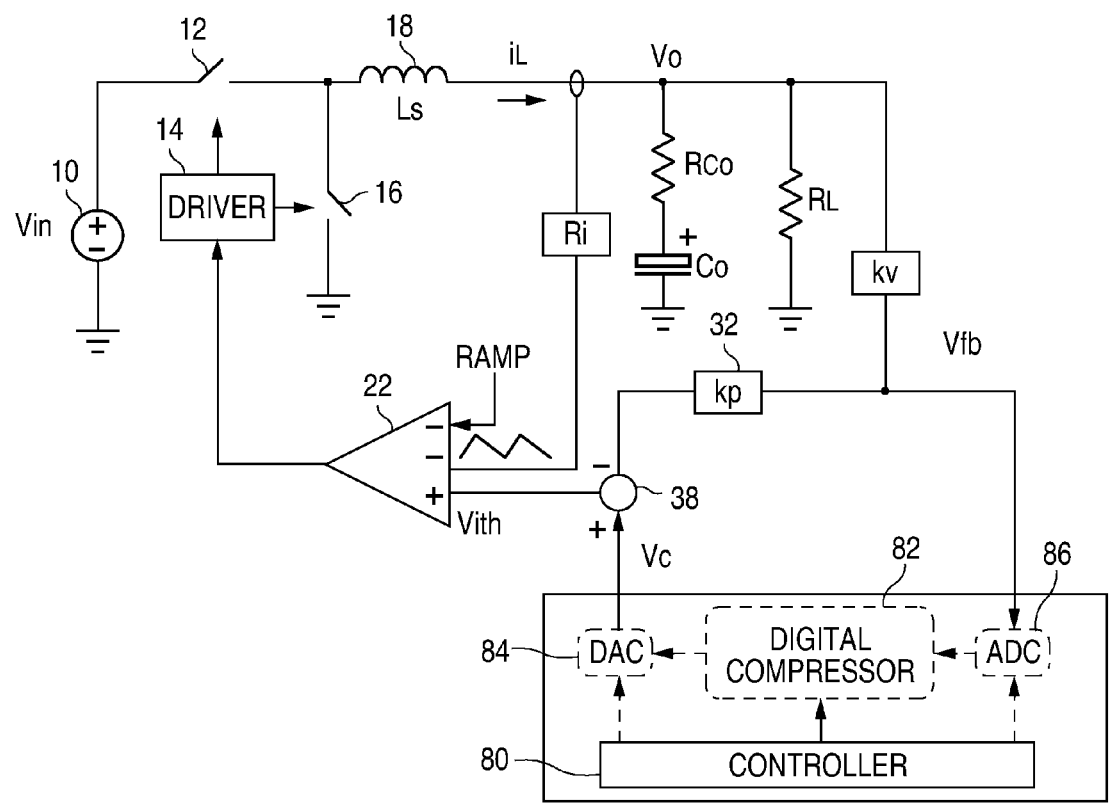
FIG. 13 illustrates an embodiment of the auto-compensation system that performs the functions of the error amplifier and compensation network digitally.

Instead of using an analog error amplifier and compensation network, the equivalent functions are performed digitally in FIG. 13. A digital controller 80 controls the various stages of the process. The transfer function of a digital compensator 82 is adjusted based on the results of the various stages described above. The DAC 84 is controlled in the same manner as the DAC 72 described above. The Vfb signal is converted to a digital signal by the ADC 86, and the gain and phase difference information is used by the controller 80 to adjust the transfer characteristics of the digital compensator 82 to achieve the desired cross-over frequency and phase margin. Using digital circuitry in a feedback loop is well known and those skilled in the art could design the circuitry of FIG. 13 using well know logic circuit techniques.

Figure 14:
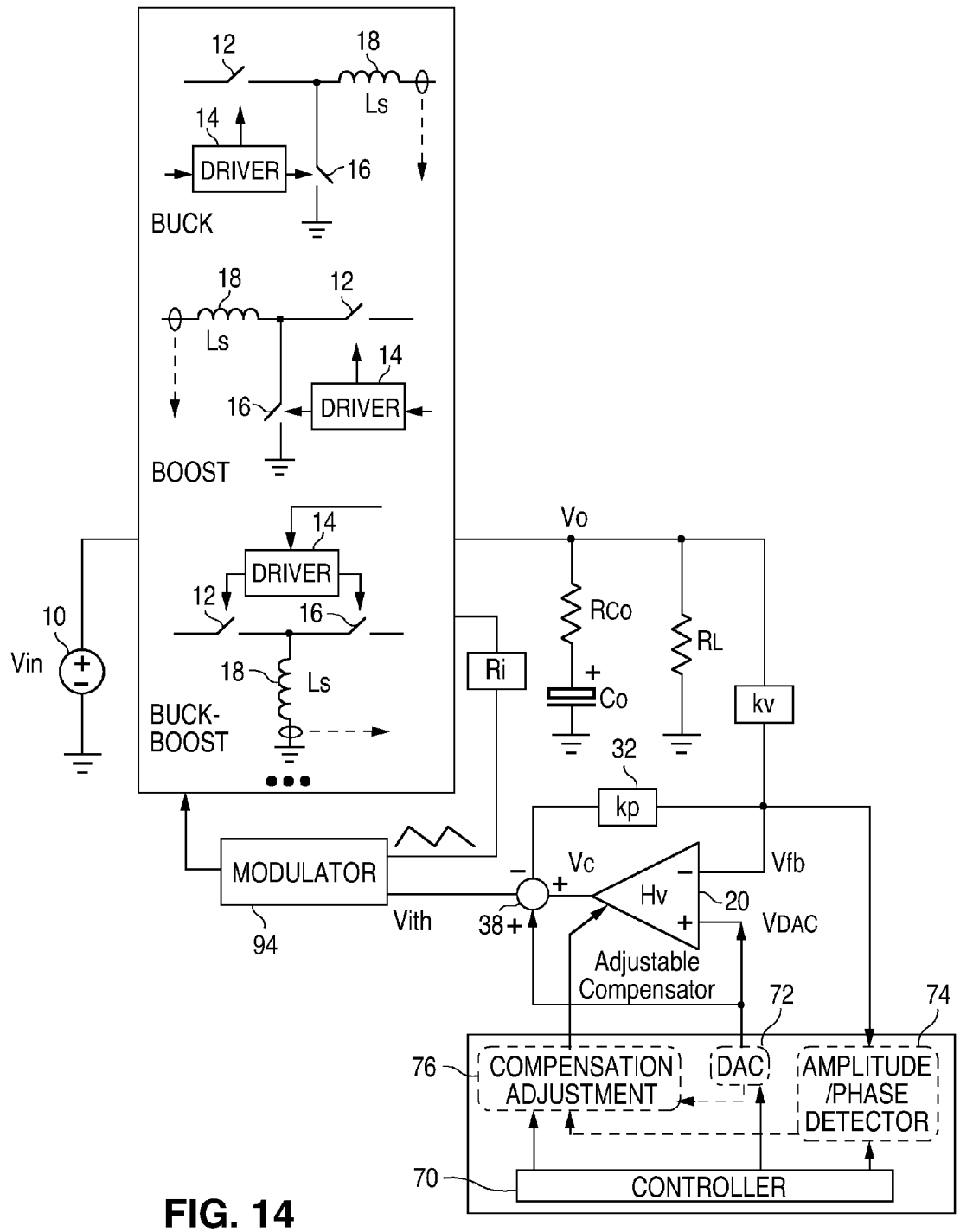
FIG. 14 illustrates how the invention may be applied to any type of current mode voltage regulator topology to provide automatic compensation.

Although the process was described with respect to one example of a current mode voltage regulator, the process is applicable to any current mode voltage regulator or even a voltage mode regulator. FIG. 14 illustrates the auto-compensation system being applied to various examples of regulators, including a buck regulator (same as FIG. 1), a boost regulator, and a buck-boost regulator. Current mode control structures include peak current mode control, valley current mode control, average current mode control, constant on-time control (e.g., using a one-shot), constant off-time control, and hysteretic control. The method can be extended to multi-phase converters. Transformer-coupled regulators can also be used. Any type of current sensing can be used. The modulator 94 may be any type of modulator that adjusts the duty cycle of the power switch 12 to achieve a regulated output voltage.

In another embodiment, instead of the auto-compensation method being carried out only at start-up, the method can be implemented during the steady state operation of the regulator. For example, the process may be carried out periodically when the load is in a standby mode. This ensures optimal operation over time and under varying operating conditions.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A method for automatically compensating a voltage regulator, the regulator having a nominal output voltage, the method comprising:
    applying a DC bias voltage to a first node in a feedback loop in the regulator to cause the output voltage to be at a first value;
    applying an AC perturbation signal to the DC bias voltage to cause the output voltage to have a ripple at a frequency of the AC signal;
    detecting a gain of the feedback loop and a phase difference between the AC signal and the ripple in the output voltage;
    using the detected gain and phase difference to automatically adjust operating characteristics of one or more components in the regulator such that, when the one or more components are connected in the feedback loop, the feedback loop has a desired gain and phase margin at the frequency of the AC signal, wherein the one or more components are not connected in the feedback loop during the steps of applying the AC perturbation signal and detecting the gain of the feedback loop and the phase difference between the AC signal and the ripple in the output voltage; and
    operating the regulator with the one or more components in the feedback loop, wherein the feedback loop detects the output voltage of the regulator and regulates a duty cycle of one or more switches to maintain a regulated output voltage.

2. The method of claim 1 wherein the frequency of the perturbation signal is selected to be approximately a unity gain frequency of the feedback loop.

3. The method of claim 1 wherein the one or more components comprises an error amplifier, and wherein the step of automatically adjusting operating characteristics of the one or more components comprises adjusting a transconductance of the error amplifier.

4. The method of claim 1 wherein the one or more components comprises a compensation network, and wherein the step of automatically adjusting operating characteristics of the one or more components comprises adjusting a characteristic of the compensation network.

5. The method of claim 4 wherein the one or more components comprises a compensation network having a resistance, and wherein the step of automatically adjusting operating characteristics of the one or more components comprises adjusting a value of the resistance.

6. The method of claim 4 wherein the one or more components comprises a compensation network having a capacitance, and wherein the step of automatically adjusting operating characteristics of the one or more components comprises adjusting a value of the capacitance.

7. The method of claim 4 wherein adjusting the characteristic of the compensation network comprises adjusting a time constant of the compensation network.

8. The method of claim 1 further comprising the feedback loop comparing a first voltage proportional to the output voltage of the regulator to a sum of the DC bias voltage and AC perturbation signal to cause the output voltage of the regulator to have the ripple.

9. The method of claim 8 wherein the first voltage and the sum of the DC bias voltage and AC perturbation signal are applied to inputs of a subtractor, wherein an output of the subtractor sets a duty cycle of the one or more switches.

10. The method of claim 1 wherein the regulated output voltage is a nominal output voltage, and wherein the step of applying the DC bias voltage causes the output voltage to be less than the nominal output voltage.

11. The method of claim 10 wherein the step of applying the AC perturbation signal to the DC bias voltage causes the output voltage to not exceed a predetermined maximum output voltage.

12. The method of claim 1 further comprising amplifying a divided output voltage of the regulator by an amplifier in the feedback loop, wherein the step of applying the AC perturbation signal to the DC bias voltage comprises applying a sum of the AC perturbation signal and DC bias voltage to a first input of a subtractor and applying an amplified divided output voltage to a second input of the subtractor, wherein an output of the subtractor is a threshold voltage that is compared to a ramping current through a power switch of the regulator.

13. The method of claim 1 further comprising generating a first voltage proportional to the output voltage of the regulator, wherein the step of applying the AC perturbation signal to the DC bias voltage comprises applying a sum of the AC perturbation signal and DC bias voltage to a first input of a subtractor and applying the first voltage to a second input of the subtractor, wherein an output of the subtractor is a threshold voltage that is compared to a ramping current through a power switch of the regulator.

14. The method of claim 13 wherein the step of operating the regulator comprises applying a reference voltage to the second input of the subtractor and applying an output of an error amplifier to a third input of the subtractor, the error amplifier comparing a feedback voltage to the reference voltage.

15. The method of claim 1 wherein the step of using the detected gain and phase difference to automatically adjust operating characteristics of one or more components in the regulator comprises selectively interconnecting a plurality of resistors in a compensation network to achieve a desired time constant of the compensation network.

16. The method of claim 1 wherein the step of using the detected gain and phase difference to automatically adjust operating characteristics of one or more components in the regulator comprises selectively interconnecting a plurality of adjustable current sources in a transconductance amplifier to achieve a desired transconductance of the transconductance amplifier.

17. The method of claim 1 wherein the steps of applying the DC bias voltage, applying the AC perturbation signal, detecting the gain and phase difference, and using the detected gain and phase difference to automatically adjust operating characteristics of one or more components in the regulator are carried out automatically under control of a digital controller.

18. The method of claim 1 wherein the feedback loop includes a digital circuit that generates a threshold voltage for comparison to a current ramp through a power switch in the regulator for regulating the output voltage.

19. The method of claim 1 wherein the feedback loop includes only analog circuitry that generates a threshold voltage for comparison to a current ramp through a power switch in the regulator for regulating the output voltage.

20. The method of claim 1 wherein the regulator is a current mode voltage regulator, and wherein the feedback loop generates a threshold voltage that is compared to a ramping current through a power switch in the regulator.

21. The method of claim 1 wherein the method is automatically carried out upon power being applied to the regulator.

22. A voltage regulator system comprising:
a voltage regulator portion and an automatic compensation portion, the regulator portion having a feedback loop receiving a first voltage proportional to an output voltage of the regulator portion, the regulator portion adjusting a duty cycle of one or more switches, in response to the first voltage, to output a regulated output voltage, the automatic compensation portion comprising:
a controller, the controller being configured for controlling circuitry in the regulator portion and in the automatic compensation circuitry portion for automatically carrying out the following method to set a desired gain of the feedback loop and phase margin at a particular frequency, the method comprising:
applying a DC bias voltage to a first node in the feedback loop in the regulator portion to cause the output voltage to be at a first value;
applying an AC perturbation signal to the DC bias voltage to cause the output voltage to have a ripple at a frequency of the AC signal;
detecting a gain of the feedback loop and a phase difference between the AC signal and the ripple in the output voltage;
using the detected gain and phase difference to automatically adjust operating characteristics of one or more components in the regulator portion such that, when the one or more components are connected in the feedback loop, the feedback loop has a desired gain and phase margin at the frequency of the AC signal, wherein the one or more components are not connected in the feedback loop during the steps of applying the AC perturbation signal and detecting the gain of the feedback loop and the phase difference between the AC signal and the ripple in the output voltage; and
operating the regulator portion with the one or more components in the feedback loop, wherein the feedback loop detects the output voltage of the regulator and regulates the duty cycle of the one or more switches to maintain the regulated output voltage.

23. The system of claim 22 wherein the frequency of the perturbation signal is selected to be approximately a unity gain frequency of the feedback loop.

24. The system of claim 22 wherein the regulator portion comprises an error amplifier, wherein the one or more components comprises the error amplifier, and wherein the step of automatically adjusting operating characteristics of the one or more components comprises adjusting a transconductance of the error amplifier.

25. The system of claim 22 wherein the regulator portion comprises a compensation network, wherein the one or more components comprises the compensation network, and wherein the step of automatically adjusting operating characteristics of the one or more components comprises adjusting a characteristic of the compensation network.

26. The system of claim 25 wherein the compensation network comprises a resistance element, and wherein the step of automatically adjusting operating characteristics of the one or more components comprises adjusting a value of the resistance element.

27. The system of claim 25 wherein adjusting the characteristic of the compensation network comprises adjusting a time constant of the compensation network.

28. The system of claim 22 wherein the regulator portion is a current mode voltage regulator.

29. The system of claim 22 further comprising an amplifier in the feedback loop amplifying a divided output voltage of the regulator portion, wherein the step of applying the AC perturbation signal to the DC bias voltage comprises applying a sum of the AC perturbation signal and DC bias voltage to a first input of a subtractor and applying an amplified divided output voltage to a second input of the subtractor, wherein an output of the subtractor is a threshold voltage that is compared to a ramping current through a power switch of the regulator portion.

30. The system of claim 22 wherein the method further comprises generating a first voltage proportional to the output voltage of the regulator, wherein the step of applying the AC perturbation signal to the DC bias voltage comprises applying a sum of the AC perturbation signal and DC bias voltage to a first input of a subtractor and applying the first voltage to a second input of the subtractor, wherein an output of the subtractor is a threshold voltage that is compared to a ramping current through a power switch of the regulator portion.

31. The system of claim 30 wherein the regulator portion comprises an error amplifier, wherein the step of operating the regulator portion comprises applying a reference voltage to the second input of the subtractor and applying an output of the error amplifier to a third input of the subtractor, the error amplifier comparing a feedback voltage to the reference voltage.

32. The system of claim 22 wherein the regulator portion comprises a compensation network, wherein the step of using the detected gain and phase difference to automatically adjust operating characteristics of one or more components in the regulator portion comprises selectively interconnecting a plurality of resistors in the compensation network to achieve a desired time constant of the compensation network.

33. The system of claim 22 wherein the regulator portion comprises a transconductance amplifier, wherein the step of using the detected gain and phase difference to automatically adjust operating characteristics of one or more components in the regulator portion comprises selectively interconnecting a plurality of adjustable current sources in the transconductance amplifier to achieve a desired transconductance of the transconductance amplifier.

34. The system of claim 22 wherein the method is automatically carried out upon power being applied to the regulator.

* * * * *